United States Patent [19]
Jackson et al.

[11] Patent Number: 5,803,495
[45] Date of Patent: Sep. 8, 1998

[54] VARIABLE VOLUME AIRBAG CUSHION

[75] Inventors: Scott A. Jackson, Centerville; Donald J. Cunningham, North Ogden, both of Utah

[73] Assignee: Autoliv ASP, Inc., Ogden, Utah

[21] Appl. No.: 636,077

[22] Filed: Apr. 22, 1996

[51] Int. Cl.$^6$ .................................................... B60R 21/16
[52] U.S. Cl. ..................................... 280/743.1; 280/731
[58] Field of Search ............................... 280/743.1, 731, 280/736, 728.1, 729, 730.1, 743.2

[56] References Cited

U.S. PATENT DOCUMENTS

| | | | |
|---|---|---|---|
| 3,473,824 | 10/1969 | Carey | 280/150 |
| 3,476,402 | 11/1969 | Wilfert | 280/150 |
| 3,966,224 | 6/1976 | Campbell et al. | 280/735 |
| 4,021,057 | 5/1977 | Held et al. | 280/735 |
| 4,213,634 | 7/1980 | Hoshino et al. | 280/728 |
| 4,805,930 | 2/1989 | Takada | 280/739 |
| 5,048,863 | 9/1991 | Henseler et al. | 280/743 |
| 5,193,847 | 3/1993 | Nakayama | 280/743.1 |
| 5,240,283 | 8/1993 | Kishi et al. | 280/729 |
| 5,249,825 | 10/1993 | Gordon et al. | 280/743 |
| 5,282,646 | 2/1994 | Melvin et al. | 280/729 |
| 5,333,903 | 8/1994 | Eyrainer et al. | 280/743.1 |
| 5,358,273 | 10/1994 | Onishi et al. | 280/743 |
| 5,498,031 | 3/1996 | Kosugi | 280/743.2 |
| 5,501,488 | 3/1996 | Saderholm et al. | 280/739 |
| 5,511,821 | 4/1996 | Meyer et al. | 280/743.1 |
| 5,560,649 | 10/1996 | Saderholm et al. | 280/743.1 |

FOREIGN PATENT DOCUMENTS

| | | | |
|---|---|---|---|
| 404166454A | 6/1992 | Japan | 280/743.1 |

OTHER PUBLICATIONS

Patent Abstract of Japan, Application Number 01205122, App. Date Aug. 8, 1989, Toyoda Gosei Co. Ltd., "Air Bag In Air Bag Device".

Patent Abstract of Japan, Application Number 10/24/89, App. Date Oct. 24, 1989.

*Primary Examiner*—Peter C. English
*Attorney, Agent, or Firm*—Sally J. Brown

[57] ABSTRACT

A variable volume airbag cushion. The cushion includes a front wall having a central region for contacting the passenger, and a periphery. This periphery is connected to a periphery of a rear wall. The rear wall includes a central inlet operatively connected to a gas generator. The generator provides gas to initially inflate the volume defined between the front wall and rear walls. The rear wall includes at least one pleat therein, with the pleat held by a frangible connection such as a tear seam. It is preferred that the pleat be folded over to lie against the remainder of the rear wall, and secured thereto, again by a frangible connection. The pleats reduce the size of the rear wall, and therefore the volume between the front and rear walls. The frangible connections will rupture above a predetermined gas pressure in the cushion. This permits the rear wall to expand to its full size, increasing the volume between the front and rear walls. The cushion may therefore compensate for increase gas production due to higher ambient temperatures, or may be used with an adaptive gas generator which produces larger or smaller amounts of gas based upon various conditions.

8 Claims, 1 Drawing Sheet

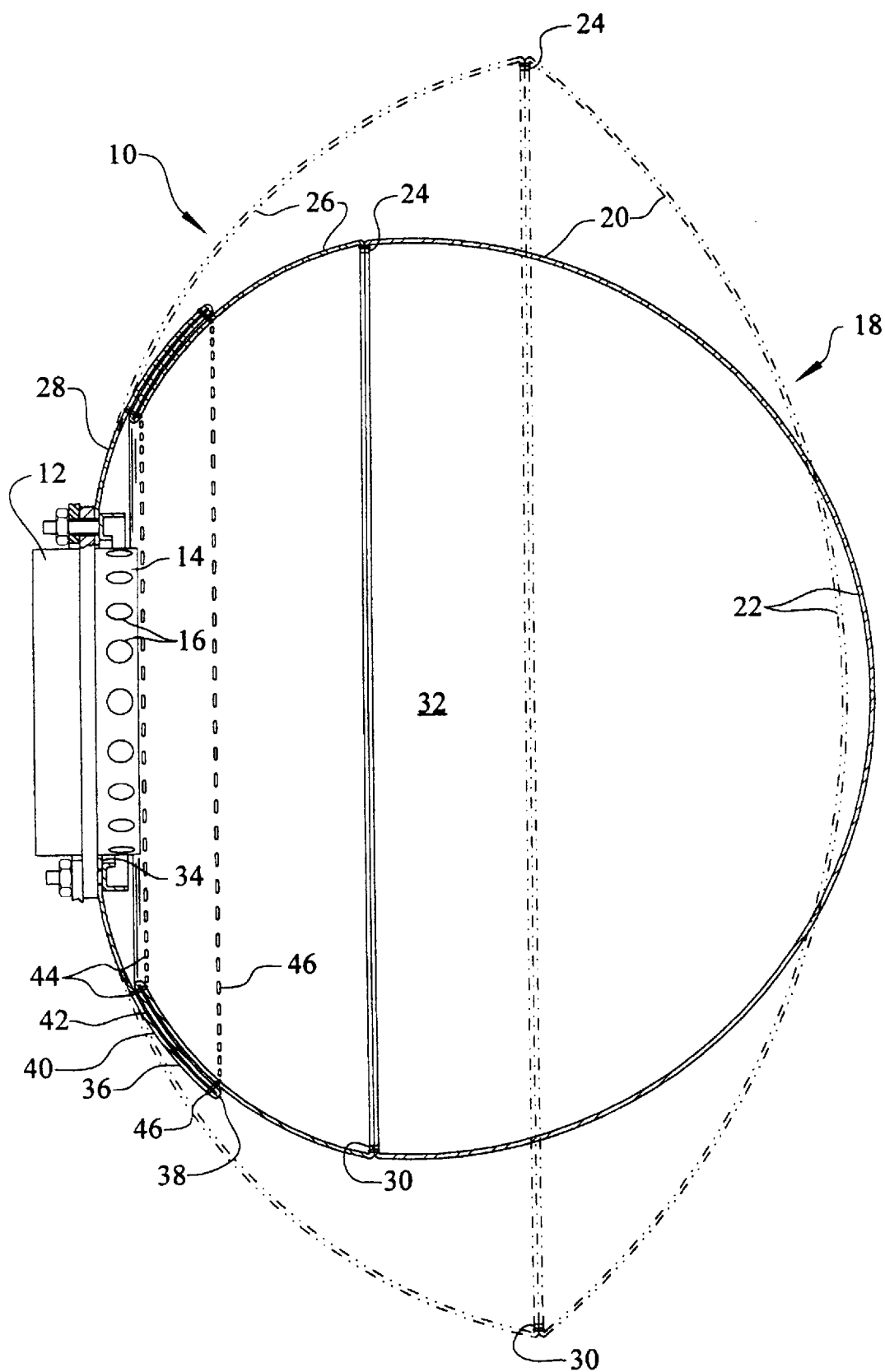

VARIABLE VOLUME AIRBAG CUSHION

BACKGROUND OF THE INVENTION

1. Field of the Invention

The present invention relates in general to inflatable passive restraint systems for protecting a vehicle occupant during a collision. In particular, the present invention relates to an improved airbag cushion having a variable volume for proper inflation over a wide range of generated gas volumes.

2. Description of the Related Art

In recent years, passive restraint systems, particularly those restraint systems incorporating inflatable cushions (commonly referred to as "airbags") have been used with increasing frequency in automobiles. In such airbag systems, one or more airbag modules are stowed in respective storage areas within the passenger compartment of the vehicle. Upon actuation, the airbag cushion is deployed into the passenger compartment through an opening in the vehicle interior.

This deployment is effected by filling or inflating the cushion using gas generated by, or released from, an inflator unit. The cushion, by its controlled deflation, provides a controlled deceleration of the occupant, thus reducing injury from a excessive deceleration. In this role the proper inflation is important. For example, if the cushion is under inflated, an insufficient pressure is applied to appropriately stop the passenger's forward movement. Conversely, if the cushion is overinflated, the cushion is too rigid and too much pressure will be applied, such that the cushion itself causes injury. To reduce the possibility of overinflation, and to provide better cushioning, various vents are typically provided in the cushion for expelling the inflating gas.

In addition to inflation, airbag size is also an important consideration. Specifically, the airbag is filled with gas upon deployment to fill a certain volume, and to extend a certain distance toward the passenger (referred to herein as length). During cushioning of the passenger to halt forward movement, the airbag is partially deflated, reducing its volume. This reduction in volume is primarily due to compression of the cushion in the direction of the passenger, i.e., lengthwise. As such, the cushion must have a length which permits it to partially compress when halting the passenger's movement, yet still provide a barrier between the passenger and the steering wheel, dashboard, etc. when the movement is halted.

To complicate this situation, the proper amount of inflation for an airbag will vary with several factors. For example, the severity of the collision, and thus the necessary deceleration of the passenger will vary for each collision. In this regard, less inflation is needed for relatively minor collisions, while more inflation is needed for severe collisions. The severity of the collision also determines the size of the airbag, specifically in the direction of the passenger or length. For minor collisions, the length need not be as great as for severe collisions.

Another factor (at least for certain types of inflator units) is ambient temperature. For the most common types of pyrotechnic inflator units, the inflator will produce an amount of gas which varies proportionally with ambient temperature. As such, if the temperature is low (e.g., 5° C.), less gas is produced, and if the temperature is high (e.g., 30° C.), more gas is produced.

These factors are of course taken into account during airbag design. For example, the length of the airbag is designed to be the largest necessary for severe collisions, and the volume is designed to provide proper inflation pressure for a severe collision even at cold temperatures. The possibility of excess pressure for a lesser collision is alleviated by the design of the vents in the cushion, or additional vents in the gas generator While this arrangement is acceptable, it has been desired in the art to permit cushion response to vary with these (or other) factors to provide a more optimal response. To this end, U.S. Pat. No. 5,048,863 to Henseler et al. discloses an airbag system having a gas generator which produces proportionally larger amounts of gas with increasing severity of collision. This of course increases internal pressure in the cushion for more severe collisions. This patent also discloses that the cushion may have a variable volume. This is achieved by taking cushion, folding an exterior wall of the cushion upon itself, and then providing break-away stitching to maintain the fold. This stitching will maintain the fold at lower pressures, but fails at the higher pressures produced for severe collisions. As such, the volume and length of the cushion are increased for more severe collisions.

While this arrangement does permit the cushion response to vary in order to improve performance, there are drawbacks to this approach. Specifically, the folding is produced near the forward face of the cushion, close to or including the contact area with the passenger. Passenger contact with these folds is less desirable than passenger contact with a smooth unbroken surface. Additionally, the folds in this patent are not stitched across their length, but are only "tacked" at discrete locations. This will result in the fold being inflated along with the main section of the cushion. This would of course tend to distort the cushion shape and again provide a less than desirable surface for passenger contact.

SUMMARY OF THE INVENTION

An object of the present invention is to provide a cushion for use in a passive airbag restraint system which provides increased safety for the passenger.

Another object of the present invention is to provide such a cushion which will adapt to provide the proper amount of deceleration for the passenger under a variety of circumstances.

Yet another object of the present invention is to provide a cushion which will adapt to provide the proper amount of deceleration under widely varying ambient temperatures.

A further object of the present invention is to provide a cushion which will adapt to provide the proper amount of deceleration under a wide range of collision forces.

Yet another object of the present invention is to provide such a cushion which has an internal volume which is variable.

Another object of the present invention is to provide such a cushion which has a length which remains sufficiently long to provide adequate protection, regardless of the particular cushion volume.

Yet another object of the present invention is to provide such a cushion which includes front and rear walls joined about their periphery, with the rear wall including secured pleats which break under a predetermined internal pressure to cause the rear wall size to increase, and to thus increase the cushion volume from a first volume to a larger second volume.

A further object of the present invention is that the secured pleats are formed in the in the rear wall to be spaced from the passenger such that the increased thickness of the pleats does not contact the passenger.

These and other objects are achieved by a variable volume airbag cushion. The cushion includes a front wall having a central region for contacting the passenger, and a periphery. This periphery is connected to a periphery of a rear wall. The rear wall includes a central inlet operatively connected to a gas generator. The generator provides gas to initially inflate a volume defined between the front wall and rear walls. The rear wall includes at least one pleat therein, with the pleat held by a frangible burst line such as a tear seam. It is preferred that the pleat be folded over to lie against the remainder of the rear wall, and secured thereto, again by a frangible connection. The pleats reduce the size of the rear wall, and therefore the volume between the front and rear walls. The frangible connections will rupture above a predetermined gas pressure in the cushion. This permits the rear wall to expand to its full size, increasing the volume between the front and rear walls. The cushion may therefore compensate for increase gas production due to higher ambient temperatures, or may be used with an adaptive gas generator which produces larger or smaller amounts of gas based upon various conditions.

BRIEF DESCRIPTION OF THE DRAWINGS

The objects and features of the invention noted above are explained in more detail with reference to the drawing, in which like reference numerals denote like elements, and which shows a cross-sectional side view of an inflated cushion according to the present invention, with the expanded condition shown in phantom line.

DETAILED DESCRIPTION OF THE INVENTION

With reference to the figure, an airbag system according to the present invention is generally designated by reference numeral 10. The system 10 includes the various components present in an inflatable passive restraint system, including a gas generating means 12. The means 12 may take any compatible form, such as pyrotechnic (e.g., sodium azide), fluid fueled (liquid or gas), hybrid, stored gas, etc. The means 12 may also vary between those generators which may produce only a predetermined amount of gas, or which may selectively produce variable amounts of gas based upon various conditions. The particular configuration of the gas generating means is not critical, but will include an outlet section 14 through which the gas exits. The outlet section will typically have a plurality of ports 16 through which the gas exits, and these ports may be arranged axially (i.e., toward the passenger) or radially (as shown). Operatively mounted over the gas generating means outlet is a cushion according to the present invention, generally designated by reference numeral 18.

The cushion 18 is formed of flexible but strong material, typically a fabric, as is known in the art. It is noted that the thickness of the material forming the cushion has been exaggerated in the figures for clarity. The cushion 18 includes a front wall 20 which is intended to be closest to the occupant in the inflated condition, as shown in the figure. The front wall 20 includes a central section 22 and a peripheral edge 24. The peripheral configuration of the front wall may vary, but would typically be circular, at least when the cushion 18 is employed for protecting the driver. It is preferred that the front wall be substantially non-permeable, such as by coating, as is known in the art.

The cushion 18 also includes a rear wall 26. The wall 26 is formed of flexible fabric, preferably at least semi-permeable, and includes a central section 28 and a peripheral edge 30. The rear wall may also include one or more vents (not shown) to permit gas to escape therethrough. As with the front wall, the peripheral edge of the rear wall will typically be circular, and will preferably correspond to that of the front wall. The peripheral edge 30 of the rear wall is permanently secured to the peripheral edge 24 of the front wall, such as by stitching, adhesives, thermal or ultrasonic bonding, etc. With their peripheral edges thus secured, the front and rear walls 20 and 26 define a volume 32 within their confines.

The rear wall 26 includes a gas opening 34 in its central section 28. For many applications the opening will be circular, and centered within the circular periphery. The opening 34 operatively communicates with, and in the embodiment shown receives, the outlet section 14 of the gas generating means. As such, the gas from means 12 may fill volume 32, as is shown in the figure.

The gas will fill the volume, increasing the pressure within the volume and thus inflating the cushion. As is known in the art, this pressure must be maintained within upper and lower limits to prevent injury to the passenger. As discussed above, however, the ambient temperature may proportionally affect the amount of gas generated or the pressure within the first volume. As such, if the front and rear walls are sized such that the cushion 18 will fully inflate with the proper pressure at low temperatures, the pressures may exceed the desired maximum at higher ambient temperatures.

It is also desirable to employ the cushion 18 with a gas generating means 12 which is adaptive, in that the means may produce different amounts of gas depending upon ambient temperature, severity of the collision, position of the occupant in the seat, etc. To account for these variables and others, the cushion 18 may adaptively increase its volume and size to fit the particular conditions.

To achieve this, the rear wall 26 will include one or more pleats 36 located intermediate the peripheral edge 30 and gas opening 34. The pleats 36 are formed by defining an annular fold line 38 surrounding the gas opening 34. An inner section 40 of the rear wall is defined immediately inside the fold line 38, and an outer section 42 of the rear wall is defined immediately outside the fold line. The inner and outer sections are then brought into abutment with each other by folding about the fold line 38. Next, the inner and outer sections are secured together along an annular burst line 44 which is spaced from the fold line 38. The pleat 36 is thus formed between the burst line 44 and the fold line 38. Additional pleats may be formed in the same manner, with the respective burst lines being spaced in the radial direction, or in close proximity.

As may be envisioned, the pleat will extend generally out of the plane of the rear wall. In the embodiment shown, the pleat extends in a direction outward of the cushion. Alternatively, the pleat could extend inward of the cushion, if desired. Extending inward may be preferred, as the pleat would then be hidden, and there would be no risk that the pleat would become entangled with any portions of the vehicle interior during deployment. To reduce this risk for outward extending pleats, the pleat(s) may be folded over about the burst line to lie against the remainder of the rear wall. The pleat may then be secured to the rear wall by a frangible connection 46, such as a tear seam, adhesives, heat or ultrasonic welding, etc., as shown. In this manner the pleat would be secured against entanglement. It is noted that while the pleat has been shown folded forward (toward the front wall) in the figure, the pleat could of course be folded toward the gas opening as an alternative.

The formation of the pleat(s) clearly reduces the radial depth of the rear wall by the amount of the inner and outer sections. Since the rear wall acts as one hemisphere surrounding the volume 32, it may be seen that this reduction in radial depth translates into a reduction in size for the volume 32, compared to the full radial depth of the rear wall. This is clearly illustrated in the figure, which shows the inflated cushion with the pleat intact, but also shows, in phantom line, the cushion size without the pleat. This difference in volume between the pleated and unpleated cushion is employed in the present invention to provide improved safety and performance.

In particular, the burst line 44 is formed as a frangible connection (as is the frangible connection 46, if employed). Specifically, the burst line 44 will secure the inner and outer sections together so long as the pressure within the cushion remains below a predetermined value. If the pressure reaches or exceeds the predetermined value, the force exerted on the burst line 44 through the rear wall causes the burst line to fail, releasing the pleat. The frangible connection 46 of course performs in a similar manner, and fails at the same predetermined pressure, if not at a lesser pressure. As with the frangible connection 46, the burst line 44 may be formed by tear seam(s), adhesives, thermal or ultrasonic welding, etc. The burst line may be formed by stitching between only the inner and outer sections. Alternatively, the pleat could be folded over to lie against the remainder of the rear wall and the stitching only then performed through the inner and outer sections, and the rear wall, as shown.

The value of the predetermined pressure will of course depend upon the particular environment in which the cushion is employed, anticipated collision forces, anticipated occupant weights, etc. There are two main uses for such a variable volume cushion: normalization, and adaptive performance. In normalization, the cushion is used to smooth out, or normalize, the protection provided the passenger despite variations in inflator performance.

As noted above, for some types of inflators the amount of gas produced is dependent upon the ambient temperature. This variation in the quantity of gas directly translates to a variation in cushion pressure, since larger quantities of gas will cause higher pressures. Excessive cushion pressure is undesirable, since the cushion will be too "hard" to protect the occupant. As such, for this application the cushion size and predetermined pressure are set such that in cold weather (when less gas is produced), the pressure does not reach the predetermined pressure, and the cushion remains sufficiently "soft" to provide protection. In hot weather, however (when more gas is produced), the pressure will exceed the predetermined pressure, the pleat(s) will fail, and the increased volume will be accessible. With this increased volume the pressure is reduced, ensuring that the cushion remains sufficiently "soft".

For adaptive performance, the cushion is used with an adaptive inflator, which produces different quantities of gas based upon various factors, as noted above. As an example, for minor collisions the inflator may produce a smaller quantity of gas, and for severe collisions the inflator may produce a larger quantity of gas. With a standard, single volume, cushion the pressure will thus vary with the amount of gas produced, providing a range of performance. With the variable volume cushion of the present invention, however, the range of performance is greater.

For example, for a moderate collision the least amount of gas is produced, the burst line remains intact, and the smaller volume is inflated. For a severe collision the greatest amount of gas is produced, the burst line fails, and the large volume is inflated to a relatively "hard" condition. These two basic "soft" and "hard" conditions may be achieved with a single-volume cushion, but with the variable volume cushion the size is increased for the more sever collision, thus providing more protection with increasing severity.

Furthermore, the gas generation may be controlled even below and above the predetermined pressure. For example, the generator may produce an internal pressure well below the predetermined pressure for a very minor collision, but continue to generate more gas to reach a higher pressure (still below the predetermined pressure) for a minor collision.

This type of incremental pressure increase, both above and below the predetermined separation pressure, would result in four different levels of inflation pressure and two different volumes, each adapted for optimal protection in increasingly severe collisions. As may be appreciated, the use of four levels is exemplary only, and a greater or lesser number could of course be employed.

The particular arrangement of the pleats in the present invention is also considered an improvement. Specifically, the pleats are located on the rear wall only. This ensures that the front wall is a smooth surface to avoid occupant injury due to contact with a fold line, tear seam, etc. Beyond this, the location of the pleats on the rear wall ensures that the pleats are located beyond the periphery of the cushion, providing the largest possible amount of this smooth surface. Finally, locating the pleats on the rear wall places the pleats adjacent the gas opening 34 and inflator. This means that the pleats can not travel an appreciable distance toward the occupant. As such, the kinetic energy achieved by the pleats (which are of course more massive than the unfilled remainder of the cushion) is reduced, and there is very little possibility of the pleats impacting the occupant through the front wall. The placement of the pleats on the rear wall therefore serves to provide the advantages of variable volume, without increasing the possibility of injury to the occupant.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. An airbag inflation assembly, comprising:
    gas generating means for producing an inflation gas; and
    a cushion operatively associated with said gas generating means, for filling said cushion with said inflation gas, said cushion including:
        a front wall formed of flexible material and having a peripheral edge;
        a rear wall formed of a flexible material and having a peripheral edge connected to said edge of said front wall, a gas opening extending through said rear wall and in communication with said gas generating means, said front wall and said rear wall together defining a volume which may be inflated by said gas; and at least one annular pleat formed in said rear wall intermediate said peripheral edge and said gas opening, said pleat being secured by a burst line which fails upon said volume reaching a predetermined pressure, failure of said burst line releasing said pleat and increasing the size of said rear wall, said volume and said cushion, and wherein said pleat is folded over to lie against said rear wall, and is frangibly secured to said rear wall.

2. An assembly as in claim 1, wherein said gas generating means has a variable gas output dependent upon ambient temperature.

3. An assembly as in claim 1, wherein said gas generating means has a selective variable gas output.

4. An assembly as in claim 3, wherein said burst line is formed by a tear seam.

5. An assembly as in claim 4, wherein said peripheral edges of said front and rear walls are substantially circular.

6. An airbag cushion, comprising:

a front wall formed of flexible material and having a peripheral edge;

a rear wall formed of a flexible material and having a peripheral edge connected to said edge of said front wall, a gas opening extending through said rear wall, said front wall and said rear wall together defining a volume which may be inflated; and at least one annular pleat formed in said rear wall intermediate said peripheral edge and said gas opening, said pleat being secured by a burst line which fails upon said volume reaching a predetermined pressure, failure of said burst line releasing said pleat and increasing the size of said rear wall, said volume and said cushion, and wherein said pleat is folded over to lie against said rear wall, and is frangibly secured to said rear wall.

7. An cushion as in claim 6, wherein said burst line is formed by a tear seam.

8. An cushion as in claim 7, wherein said peripheral edges of said front and rear walls are substantially circular.

\* \* \* \* \*